E. A. DUNNING.
ANTISLIPPING DEVICE.
APPLICATION FILED FEB. 6, 1912.
1,062,326. Patented May 20, 1913.
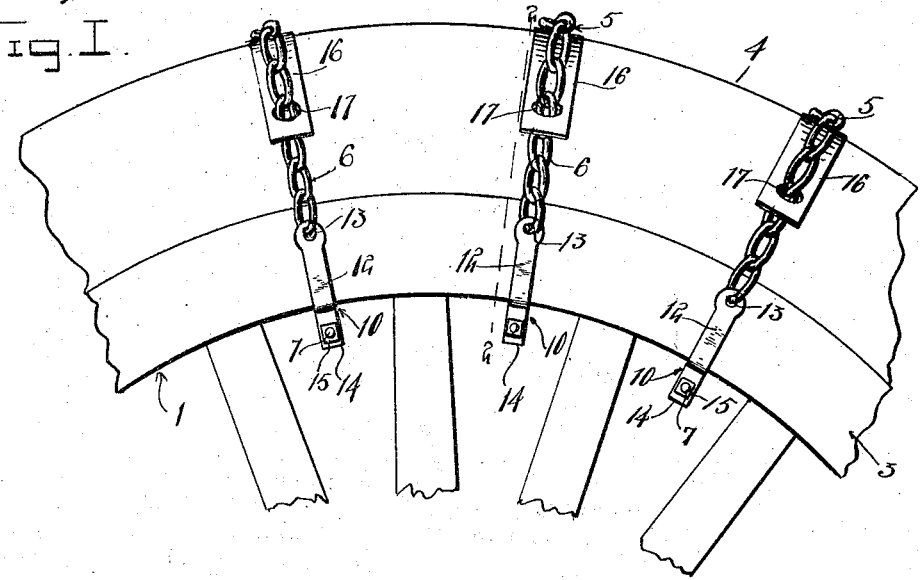
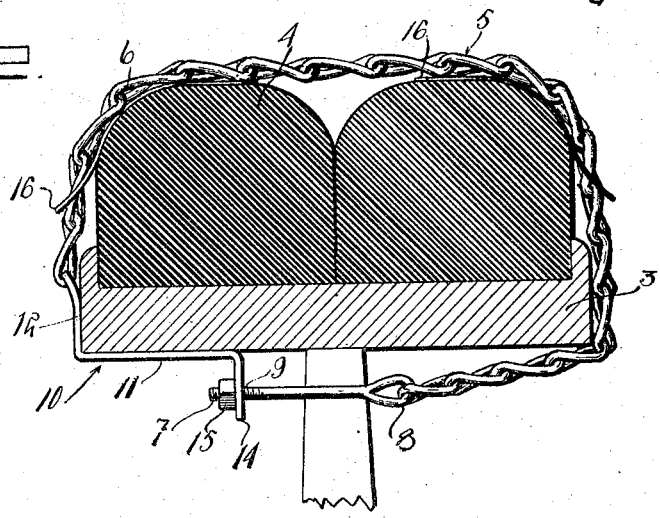
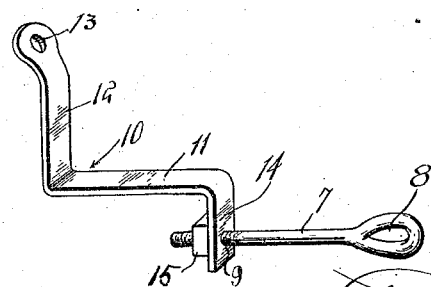
Witnesses
Inventor
E. A. Dunning.
By
Attorneys

UNITED STATES PATENT OFFICE.

ELLSWORTH A. DUNNING, OF MINNEAPOLIS, MINNESOTA.

ANTISLIPPING DEVICE.

1,062,326.   Specification of Letters Patent.   Patented May 20, 1913.

Application filed February 6, 1912. Serial No. 675,695.

*To all whom it may concern:*

Be it known that I, ELLSWORTH A. DUNNING, a citizen of the United States, residing at Minneapolis, in the county of Hennepin, State of Minnesota, have invented certain new and useful Improvements in Antislipping Devices; and I do hereby declare the following to be a full, clear, and exact description of the invention, such as will enable others skilled in the art to which it appertains to make and use the same.

The present invention is directed to improvements in anti-slipping devices, being particularly adapted for use in connection with motor trucks and the like.

The invention has for its object to produce an improved anti-slipping device which may be easily and quickly applied to or removed from the tire.

With this and other objects in view, the invention consists in certain novel features of construction, combination and arrangement of parts as will be hereinafter fully described and claimed.

In the drawing: Figure 1 is a side elevation of a portion of a wheel, the devices applied. Fig. 2 is a transverse sectional view on line 2—2 of Fig. 1. Fig. 3 is a perspective view of one of the angular clamp members.

Referring to the drawing, the numeral 1 designates a wheel having the spokes 2 and to which is connected in the usual manner the rim 3. Secured to the rim is a pair of solid rubber tires 4, thus adapting the wheel for use upon motor trucks.

Adapted to be clamped upon the tire are the anti-slipping devices 5, the same being preferably attached to the rim and tire at points between the spokes, as clearly shown in Fig. 1 of the drawings. Each device consists of a chain 6 which is passed from one edge of the rim over the tires 4 and stopping at a point under the center of the rim. A bolt 7 is provided and is formed with an eye 8 and to which one end of the chain 6 is attached, the threaded end of the bolt 7 passing through the threaded opening 9 formed in the lower end of the clamping member 10. The clamping member 10 consists of a horizontally disposed body portion 11 having its ends bent at right angles and extended in opposite directions. The upper end 12 is provided with a perforation 13, and in which is secured the other end of the chain 5, the lower end 14 being formed with the opening 9 hereinbefore mentioned. An adjusting nut 15 is mounted upon the threaded end of the bolt 7 and bears against the outer face of the end 14, said nut being adapted upon manipulation to firmly clamp the device upon the tire.

To prevent injury to the outer rounded edges of each tire 4, protecting plates 16 are provided, each being formed adjacent its lower edge with an opening 17 and through which the chain 6 passes, the relation between the protector and chain being such that the major portions of the plates 16 are positioned under the chain 5, thus securely holding said plates against the tires to prevent injury thereto incident to the same coming in contact with the ground during the travel of the wheel. The plates 16 are preferably formed from metal, and are so bent as to conform to the curvature of the edges of the tires 4. It is obvious that other material may be used in forming the plates, such as raw hide or the like.

From the foregoing description, taken in connection with the drawing the operation and advantages of the invention will be apparent to those skilled in the art.

What is claimed is:

An anti-slipping device for wheels comprising a clamping member having a body portion adapted to engage the under surface of one edge of the wheel rim, said body portion terminating in oppositely directed upper and lower ends, the upper end engaging the edge of the wheel rim, an opening formed in the lower end for adjustably receiving an eye-bolt, a chain having one end secured to the upper end of the clamp member and passed over the tires and having its other end connected to the eye-bolt.

In testimony whereof, I affix my signature, in presence of two witnesses.

ELLSWORTH A. DUNNING.

Witnesses:
E. M. GLEASON,
KATHERINE GLEASON.

Copies of this patent may be obtained for five cents each, by addressing the "Commissioner of Patents, Washington, D. C."